United States Patent
Kanda

(10) Patent No.: US 9,336,615 B2
(45) Date of Patent: May 10, 2016

(54) PLANT INFORMATION DISPLAY METHOD AND DISPLAY APPARATUS

(71) Applicant: YOKOGAWA ELECTRIC CORPORATION, Musashino-shi, Tokyo (JP)

(72) Inventor: Mitsuo Kanda, Tokyo (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 320 days.

(21) Appl. No.: 13/763,204

(22) Filed: Feb. 8, 2013

(65) Prior Publication Data
US 2013/0201192 A1    Aug. 8, 2013

(30) Foreign Application Priority Data
Feb. 8, 2012    (JP) .................... 2012-025261

(51) Int. Cl.
*G06T 11/20*    (2006.01)
*G06F 17/30*    (2006.01)

(52) U.S. Cl.
CPC ........ *G06T 11/206* (2013.01); *G06F 17/30572* (2013.01)

(58) Field of Classification Search
CPC .................. G06T 11/206; G06F 17/30572
See application file for complete search history.

(56) References Cited

U.S. PATENT DOCUMENTS

| | | | |
|---|---|---|---|
| 6,282,455 B1 * | 8/2001 | Engdahl | 700/83 |
| 2013/0006390 A1 * | 1/2013 | Kreft et al. | 700/10 |
| 2013/0151564 A1 * | 6/2013 | Brinkman | 707/797 |

FOREIGN PATENT DOCUMENTS

| | | |
|---|---|---|
| JP | 7-239850 A | 9/1995 |
| JP | 2001-306603 A | 11/2001 |
| JP | 2005-346444 A | 12/2005 |

OTHER PUBLICATIONS

Japanese Office Action dated Oct. 30, 2013, issued in corresponding to Japanese Application No. 2012-025261.

* cited by examiner

*Primary Examiner* — Grace Park
(74) *Attorney, Agent, or Firm* — Westerman, Hattori, Daniels & Adrian, LLP

(57) ABSTRACT

A plant information display method for displaying elements related to a plant in a tree view of hierarchical representation comprises the steps of a tree view display step of displaying plural tree view representations based on different viewpoints side by side and a relation display step of graphically displaying a relation between elements separately contained in the plural tree view representations, which are displayed in the tree view display step.

In this method, plural tree view representations based on different viewpoints are displayed side by side and a relation between elements, which are separately contained in the plural tree view representations displayed side by side, is graphically displayed.

6 Claims, 6 Drawing Sheets

PLANT INFORMATION DISPLAY METHOD AND DISPLAY APPARATUS

BACKGROUND OF THE INVENTION

1. Field of the Invention

The present invention relates to a plant information display method, etc. for displaying elements regarding a plant in a tree view of hierarchical representation, and more particularly to a plant information display method, etc. that can display elements regarding a plant in a variety of representations.

2. Description of the Related Art

In control of a plant, there are many measurement points as measurement targets (hereinafter referred to as "items") to properly perform control and analyses. An item ID, i.e., an identifier for accessing an item is uniquely assigned to each item in a system so that a user can individually access those many items. When the user accesses data in the plant, the user executes the data access (read and write) by designating the item ID. However, it is practically difficult for the user to keep all the item IDs in mind. Prior to designating the item ID, therefore, the user has to search for the item ID of the target item.

When there are items in so many numbers as that the user cannot keep the item IDs in mind, a tree view represented in a user interface of a computer is generally used as a scheme for searching the item IDs. The tree view enables the many item IDs to be displayed with grouping. Upon the user selecting, from a group list represented in the tree view, a group to which the objective item belongs, a list of items belonging to the selected group can be displayed.

Furthermore, the grouping of items in the tree view may be set in plural stages instead of one stage. In the former case, the user can search for the objective item ID by successively repeating selection of a group, to which the objective item belongs, from the grouping in plural stages, which are represented in the tree view. (See, e.g., Japanese Unexamined Patent Application Publication No. 2005-346444).

FIG. 7 illustrates a tree view in accordance with the plant hierarchical structure of ISA S95. In FIG. 7, for the sake of simplification, "Process Cell" is illustrated as a top level node with omission of "Enterprise", "Site" and "Area".

In FIG. 7, starting from the top in order, "Process Cell 01" is a node at an uppermost position in the illustrated tree structure, and "Unit 01" is a node for grouping items under "Process Cell 01". Furthermore, "Tank 01" is a node indicating a first tank bound to "Unit 01". "Temperature" is a node bound to an item ID representing a state (temperature) of "Tank 01", and "Level" is a node bound to an item ID representing a state (level) of "Tank 01". "Pump 01" is a node representing a pump bound to "Tank 01", "Flow Rate" is a node bound to an item ID representing a state (flow rate) of "Pump 01", and "Setting Value" is a node bound to an item ID representing a state (setting value) of "Pump 01". "Valve 01" is a node representing a valve bound to "Tank 01", "Opening Degree" is a node bound to an item ID representing a state (opening degree) of "Valve 01", and "Setting Value" is a node bound to an item ID representing a state (setting value) of "Valve 01". "Tank 02" is a node indicating a second tank bound to "Unit 01", and "Unit 02" is a node for further grouping other items under "Process Cell 01".

It is to be noted that a hierarchy under "Tank 02" and a hierarchy under "Unit 02" are omitted from the drawing.

Manipulations performed by the user when measuring the opening degree of "Valve 01" are described below. Premised user conditions are as follows: (1) the user does not keep in mind the item ID for accessing the opening degree of "Valve 01", (2) the user understands to which "Unit" in the plant "Tank 01" is bound, and can select, from a "Unit" list, a relevant "Unit" to which "Tank 01" is bound, (3) the user understands to which "Tank" in the plant "Valve 01" is bound, and can select, from a "list of Tanks bound to Unit", a relevant "Tank" to which "Valve 01" is bound, and (4) the user understands the structure of data held by "Valve 01" and can select, from a list of item IDs bound to "Valve 01", a node of "Opening Degree" representing the objective item ID.

Manipulation procedures performed by the user and operations corresponding to the manipulation procedures are described below.

(1) First, the user performs a manipulation to display the tree view representing the plant hierarchy. With that manipulation, "Process Cell 01" is displayed as a "Top" node. At this time, the node of "Process Cell 01" is in a closed state, and children ("Unit 01" and "Unit 02") of "Process Cell 01" are not displayed.

(2) Then, the user selects and spreads the node of "Process Cell 01". With that manipulation, the node of "Process Cell 01" is opened, and the children "Unit 01" and "Unit 02" are displayed. At this time, the node of "Unit 01" is in a closed state, and the children ("Tank 01" and "Tank 02") of "Unit 01" are not displayed. The node of "Unit 02" is also in a closed state, and the children (not illustrated) of "Unit 02" are not displayed.

(3) The user selects and spreads the node of "Unit 01" to which the objective pump is supposed to be bound. With that manipulation, the node of "Unit 01" is opened, and the children "Tank 01" and "Tank 02" are displayed. At this time, the node of "Tank 01" is in a closed state, and the children ("Pump 01" and "Valve 01") of "Tank 01" are not displayed. The node of "Tank 02" is also in a closed state, and the children (not illustrated) of "Tank 02" are not displayed.

(4) The user selects and spreads the node of "Tank 01" to which the objective pump is supposed to be bound. With that manipulation, the node of "Tank 01" is opened, and the children "Pump 01" and "Valve 01" are displayed. At this time, the node of "Pump 01" is in a closed state, and the children ("Flow Rate" and "Setting Value") of "Pump 01" are not displayed. The node of "Valve 01" is also in a closed state, and the children ("Opening Degree" and "Setting Value") of "Valve 01" are not displayed.

(5) The user selects and spreads the node of "Valve 01" that is the objective device. With that manipulation, the node of "Valve 01" is opened, and the children "Opening Degree" and "Setting Value" are displayed.

(6) The user finds the node of "Opening Degree" that is the objective item.

In the related-art tree view, all the items are arranged on one tree view. Parent nodes and child nodes in the tree view are related to each other by binding them based on particular information. The particular information includes, for example:

(1) Information based on physical connections in terms of equipment and devices, and (2) Information binding, as children, devices operated in production activity at the same time, i.e., as accessories belonging to the production activity (parent).

In the above-described specifications specifying the tree view, there occurs no confusion when all the items can be represented in an orderly way using only the tree structure (e.g., in the form of plant hierarchy). However, when a loop is generated in relation between items instead of being in the hierarchical relation in the tree, e.g., when loop gauges that are important in trying to look at the plant from the viewpoint of control are to be indicated in the plant hierarchy, such a relation cannot be represented properly.

SUMMARY OF THE INVENTION

An object of the present invention is to provide a plant information display method and display apparatus capable of representing information that cannot be represented using only a tree structure.

According to the present invention, there is provided a plant information display method for displaying elements related to a plant in a tree view of hierarchical representation, the method including a tree view display step of displaying plural tree view representations based on different viewpoints side by side, and a relation display step of graphically displaying a relation between elements separately contained in the plural tree view representations, which are displayed in the tree view display step.

According to the above-described plant information display method, since the relation between the elements separately contained in the plural tree view representations based on different viewpoints are graphically displayed, plant information can be represented in a manner capable of representing information that cannot be represented using only a tree structure.

The plant information display method may further include a step of previously storing relation information indicating the relation between the elements separately contained in the plural tree view representations based on different viewpoints, and, in the relation display step, the relation between the elements may be displayed based on the relation information stored in the storing step.

The relation between the elements may indicate a relation between an input and an output of information in control.

In the relation display step, the relation between the elements may be displayed by displaying a line interconnecting the elements contained in the tree view representations.

In the relation display step, the relation between the elements may be displayed for, instead of an element not appearing in the tree view representations, a parent element of the former element, the parent element appearing in the tree view representations.

According to the present invention, there is further provided a plant information display apparatus for displaying elements related to a plant in a tree view of hierarchical representation, the apparatus including tree view display means for displaying plural tree view representations based on different viewpoints side by side, and relation display means for graphically displaying a relation between elements separately contained in the plural tree view representations, which are displayed by the tree view display means.

According to the above-described plant information display apparatus, since the relation between the elements separately contained in the plural tree view representations based on different viewpoints are graphically displayed, plant information can be represented in a manner capable of representing information that cannot be represented using only a tree structure.

Thus, with the plant information display method according to the present invention, since the relation between the elements separately contained in the plural tree view representations based on different viewpoints are graphically displayed, plant information can be represented in a manner capable of representing information that cannot be represented using only the tree structure.

With the plant information display apparatus according to the present invention, since the relation between the elements separately contained in the plural tree view representations based on different viewpoints are graphically displayed, plant information can be represented in a manner capable of representing information that cannot be represented using only the tree structure.

DESCRIPTION OF THE PREFERRED EMBODIMENTS

One embodiment of a plant information display method according to the present invention will be described below.

Figure 1:
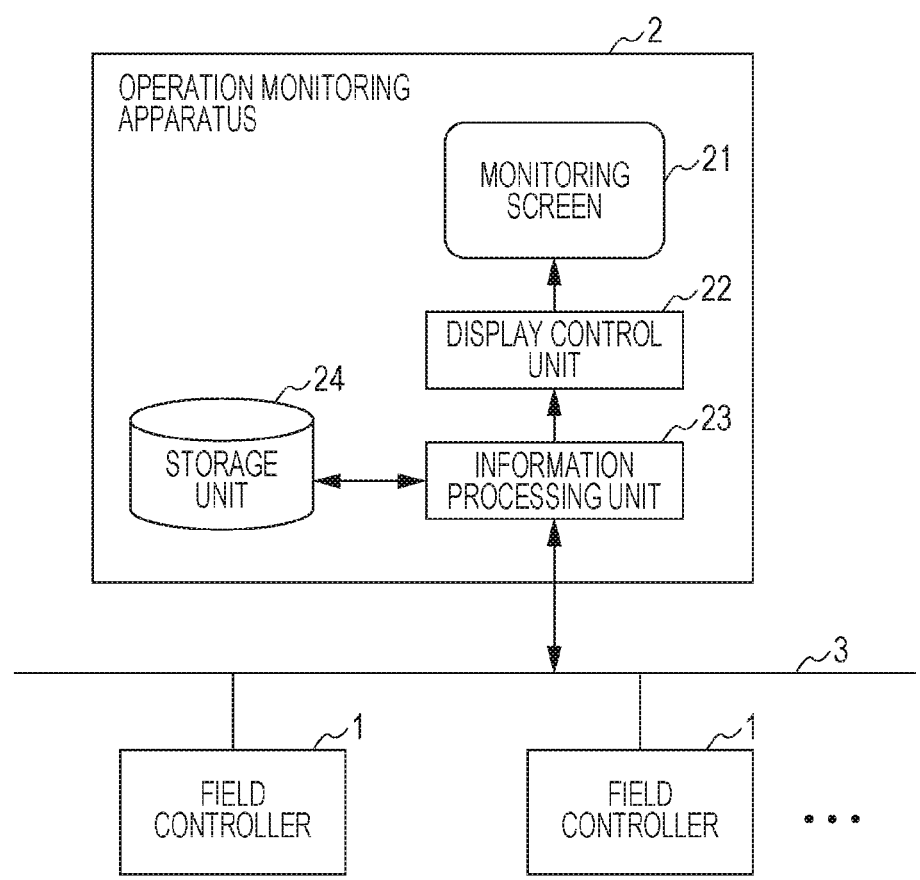
FIG. 1 is a block diagram illustrating a configuration example of a field control system to which a plant information display method according to one embodiment is applied.

FIG. 1 is a block diagram illustrating a configuration example of a field control system to which the plant information display method according to the embodiment is applied.

As illustrated in FIG. 1, a field control system includes field controllers 1, 1, . . . that are disposed within a plant in a distributed way, and an operation monitoring apparatus 2 for operating and monitoring a group of field devices (not illustrated), which are disposed in the plant, through the field controllers 1, 1, . . . . The field controllers 1, 1, . . . and the operation monitoring apparatus 2 are connected to each other via a communication line 3.

As illustrated in FIG. 1, the operation monitoring apparatus 2 includes a monitoring screen 21 on which plant information is displayed, a display control unit 22 for controlling display of the plant information on the monitoring screen 21, an information processing unit 23 for executing information processes, such as obtaining information necessary for displaying the plant information, and a storage unit 24 for storing various types of information, such as relation information necessary for displaying the plant information.

The monitoring screen 21, the display control unit 22 and the information processing unit 23 belonging to the operation monitoring apparatus 2 may include a central processing unit (CPU), a computer, a computer unit, a data processor, a microcomputer, microelectronics device, or a microprocessor. The operation monitoring apparatus 2 includes a storage unit 24 that includes, but is not limited to a read/write memory, read only memory (ROM), random access memory (RAM), DRAM, SRAM etc.

Figure 2:
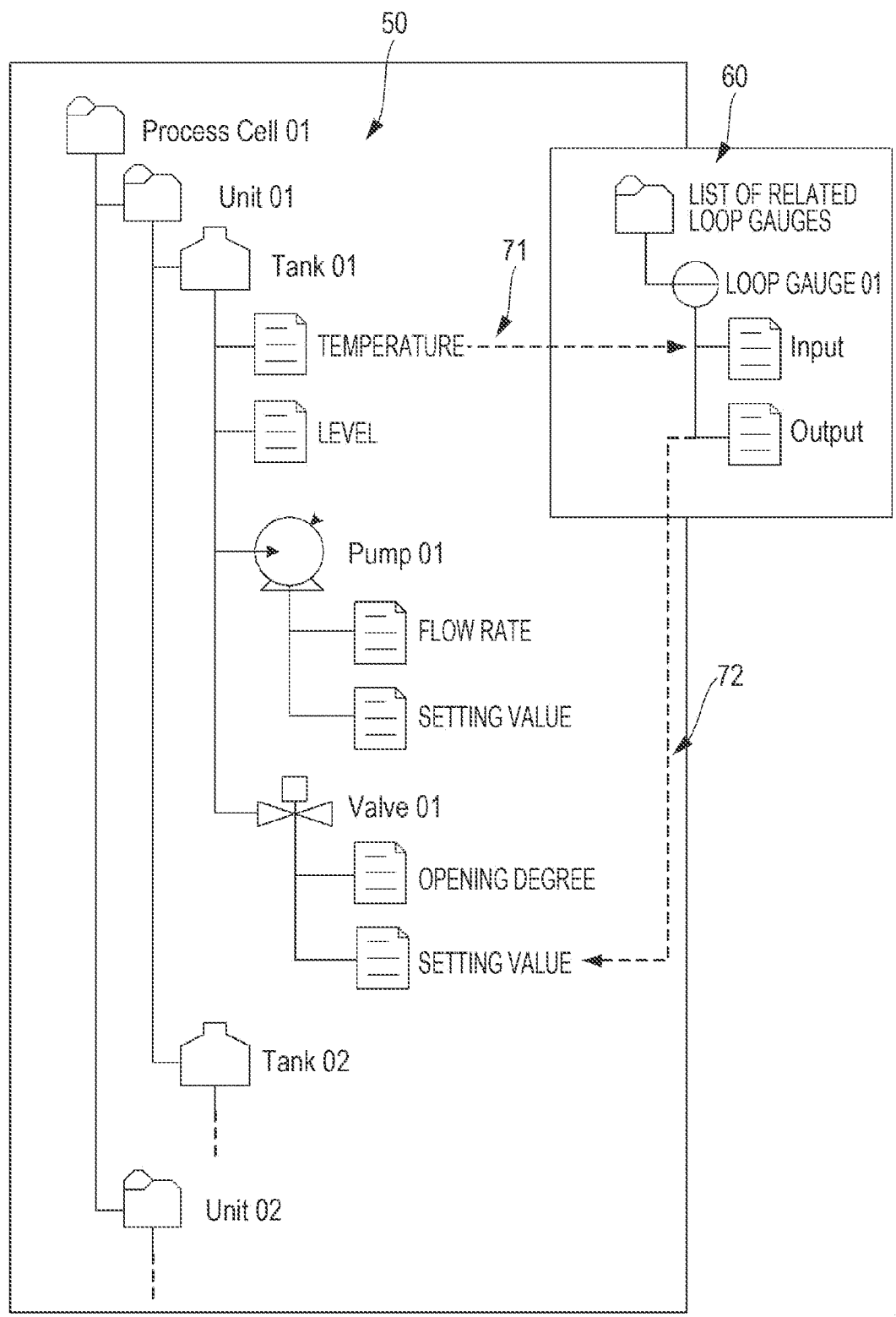
FIG. 2 illustrates a display example of a tree view on a monitoring screen.

FIG. 2 illustrates a display example of a tree view on the monitoring screen 21.

A tree view 50, illustrated in FIG. 2, is displayed in accordance with the plant hierarchy structure of ISA S95. In FIG. 2, for the sake of simplification, "Process Cell" is illustrated as a top level node with omission of "Enterprise", "Site" and "Area". Another tree view 60, also illustrated in FIG. 2, is a tree view for a loop, which displays loop gauges related to a user-designated node (described later) together.

Thus, two tree views represented from different viewpoints are displayed on the monitoring screen 21. Of those two tree views, the tree view 60 is displayed when a user designates "Tank 01" aiming to display a related loop structure.

In the tree view 50 illustrated in FIG. 2, starting from the top in order, "Process Cell 01" is a node at an uppermost position in the illustrated tree structure, and "Unit 01" is a node for grouping items under "Process Cell 01". Furthermore, "Tank 01" is a node that is designated by the user as mentioned above, and that indicates a first tank bound to "Unit 01". "Temperature" is a node of an item representing a state (temperature) of "Tank 01", and "Level" is a node of an item representing a state (level) of "Tank 01". "Pump 01" is a node representing a pump bound to "Tank 01", "Flow Rate" is a node of an item representing a state (flow rate) of "Pump 01", and "Setting Value" is a node of an item representing a state (setting value) of "Pump 01". "Valve 01" is a node representing a valve bound to "Tank 01", "Opening Degree" is a node of an item representing a state (opening degree) of "Valve 01", and "Setting Value" is a node of an item representing a state (setting value) of "Valve 01". "Tank 02" is a node indicating a second tank bound to "Unit 01", and "Unit 02" is a node for further grouping other items under "Process Cell 01".

It is to be noted that a hierarchy under "Tank 02" and a hierarchy under "Unit 02" are omitted from the drawing.

The tree view 60 for the loop, illustrated in FIG. 2, represents loop gauges, etc. related to the node "Tank 01" that has been designated by the user in the tree view 50.

In the tree view 60 illustrated in FIG. 2, starting from the top in order, "List of Related Loop Gauges" is an upper-level folder for displaying together loop gauges related to the node "Tank 01", which has been designated by the user. Furthermore, "Loop Gauge 01" is a node allocated in the tree view 60 and forming a control loop, "Input" is a node of an item representing an input ("Input") to "Loop Gauge 01", and "Output" is a node of an item representing an output ("Output") from "Loop Gauge 01".

A line 71 illustrated in FIG. 2 is drawn across the tree view 50 and the tree view 60 to indicate that the temperature of "Tank 01" and the "Input" to "Loop Gauge 01" are related to each other. An arrow of the line 71 denotes a direction of control, i.e., that the temperature of "Tank 01" is applied as the "Input" to "Loop Gauge 01".

Also, a line 72 illustrated in FIG. 2 is drawn across the tree view 50 and the tree view 60 to indicate that the "Output" from "Loop Gauge 01" and "Setting Value" of "Valve 01" are related to each other. An arrow of the line 72 denotes a direction of control, i.e., that the "Output" from "Loop Gauge 01" is applied as the "Setting Value" of "Valve 01".

Figure 3:
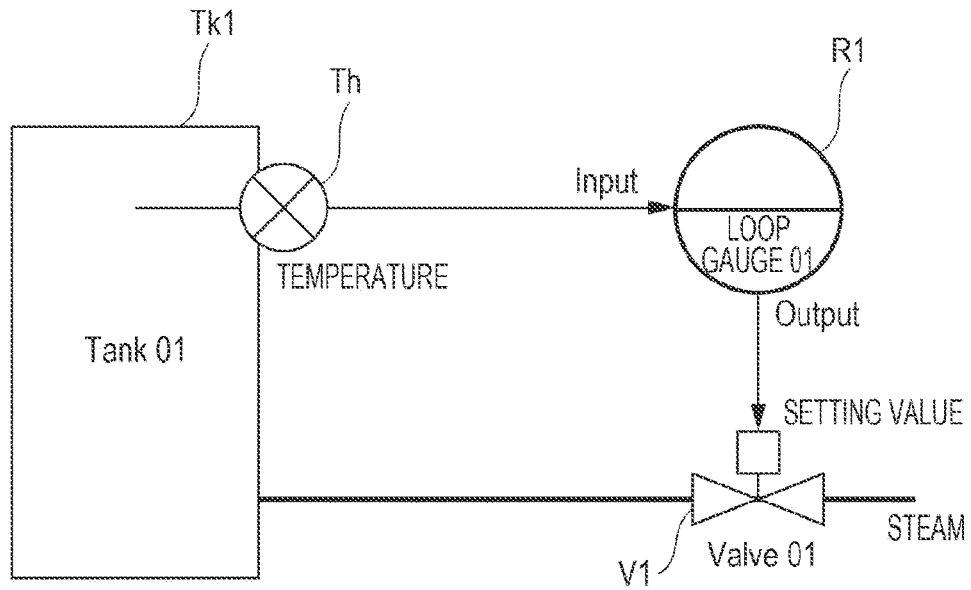
FIG. 3 is a block diagram illustrating a configuration of an actual plant, which forms a loop structure from the viewpoint of control.

FIG. 3 is a block diagram illustrating a configuration of an actual plant in the surrounding of "Loop Gauge 01", which forms a loop structure from the viewpoint of control.

As illustrated in FIG. 3, the temperature of the content in a tank Tk1, denoted by "Tank 01", is measured by a temperature sensor Th, and a measured value is applied, as the "Input", to a loop gauge R1 denoted by "Loop Gauge 01". Moreover, an output value of the loop gauge R1 is applied, as the "Output", to a valve V1 denoted by "Valve 01" such that the opening degree of the valve V1 is controlled. Steam is supplied to the tank Tk1 at a flow rate corresponding to the opening degree of the valve V1, whereby the temperature of the content in the tank Tk1 is controlled.

The lines 71 and 72 across the tree view 50 and the tree view 60, illustrated in FIG. 2, represent the above-mentioned control loops.

Figure 4:
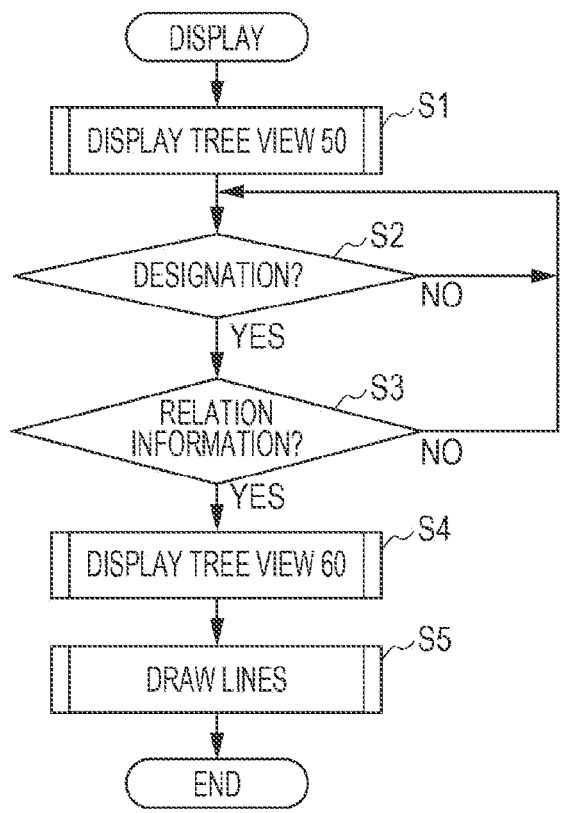
FIG. 4 is a flowchart illustrating operations of a display control unit and an information processing unit.

FIG. 4 is a flowchart illustrating operations of the display control unit 22 and the information processing unit 23 when the display screen image illustrated in FIG. 2 is displayed on the monitoring screen 21.

In step S1 of FIG. 4, the tree view 50 is drawn (displayed) based on the information stored in the storage unit 24.

In step S2, after waiting for designation of any node (e.g., "Tank 01") by the user with intent to display the related loop structure, the process flow goes to step S3.

In step S3, it is determined whether relation information is present in the storage unit 24 with respect to the node designated in step S2. If the determination result is "yes", the process flow goes to step S4. If the determination result is "no", the process flow returns to step S2. The term "relation information" implies information necessary for displaying the related loop structure regarding the relevant node.

In step S4, based on the relation information in the storage unit 24, information necessary for drawing the tree view 60 is obtained from nodes related to the node that has been designated in step S2, and the tree view 60 is drawn (displayed). The following description is made in connection with the case where "Tank 01" is designated.

(1) The "Temperature" of "Tank 01" and the "Level" of "Tank 01" are obtained from the respective item nodes bound to the node of "Tank 01" that has been designated by the user.

(2) The other nodes bound to the node of "Tank 01" designated by the user, i.e., "Pump 01" and "Valve 01", are obtained.

(3) The "Flow Rate" of "Pump 01", the "Setting Value" of "Pump 01", the "Opening Degree" of "Valve 01", and the "Setting Value" of "Valve 01" are obtained from the respective item nodes bound to the nodes ("Pump 01" and "Valve 01"), which are in turn bound to the node of "Tank 01" having been designated by the user.

(4) Then, the loop gauges related to the items from which the information has been obtained in above (1) to (3) are all extracted. As a result, "Loop Gauge 01" is extracted.

(5) Then, the tree view 60 (FIG. 2) is drawn to display "Loop Gauge 01" and all lower-level items belonging to "Loop Gauge 01". As a result, "Loop Gauge 01", "Input", and "Output", the latter two being bound to "Loop Gauge 01", are displayed in the tree view 60.

Next, in step S5, the lines 71 and 72 (FIG. 2) are drawn, followed by ending of the process flow.

In step S5, the line 71 (FIG. 2) is first drawn based on the relation information in the storage unit 24. In the illustrated example, the line 71 is drawn between the "Input" of "Loop Gauge 01" and the "Temperature" of "Tank 01" across the tree view 50 and the tree view 60. At that time, because the transmission destination of the information is the "Input" of "Loop Gauge 01", an arrow is attached to a terminal end of the line 71 with an arrow head directed toward the "Input" of "Loop Gauge 01".

The line 72 (FIG. 2) is then drawn based on the relation information in the storage unit 24. In the illustrated example, the line 72 is drawn between the "Output" of "Loop Gauge 01" and the "Setting Value" of "Valve 01" across the tree view 50 and the tree view 60. At that time, because the transmission destination of the information is the "Setting Value" of "Valve 01", an arrow is attached to a terminal end of the line 72 with an arrow head directed toward the "Setting Value" of "Valve 01".

With the above-described process, the tree view 50, the tree view 60, the line 71, and the line 72, all illustrated in FIG. 2, are drawn on the monitoring screen 21 (FIG. 1).

Thus, according to the embodiment described above, by drawing, between nodes displayed respectively in the tree view 50 and the tree view 60, the lines 71 and 72 each indicating the relation between the corresponding nodes, it is possible to represent that the relevant nodes are related to each other. Moreover, by indicating the direction in which each of the lines 71 and 72 is destined, the user can recognize the transmission direction of the information. In the case illustrated in FIG. 2, for example, the user can understand that the "Temperature" of "Tank 01" is transmitted to the "Input" of "Loop Gauge 01", and that the "Output" of "Loop Gauge 01" is transmitted to the "Setting Value" of "Valve 01".

In addition, by looking over the entirety of the tree view 50, the tree view 60, the line 71, and the line 72, the user can visually confirm that the following three events form a control loop:

(1) "Valve 01" is bound as an underlying layer to "Tank 01".

(2) The "Temperature" of "Tank 01" becomes the "Input" of "Loop Gauge 01".

(3) The "Output" of "Loop Gauge 01" becomes the "Setting Value" of "Valve 01".

Figure 5:
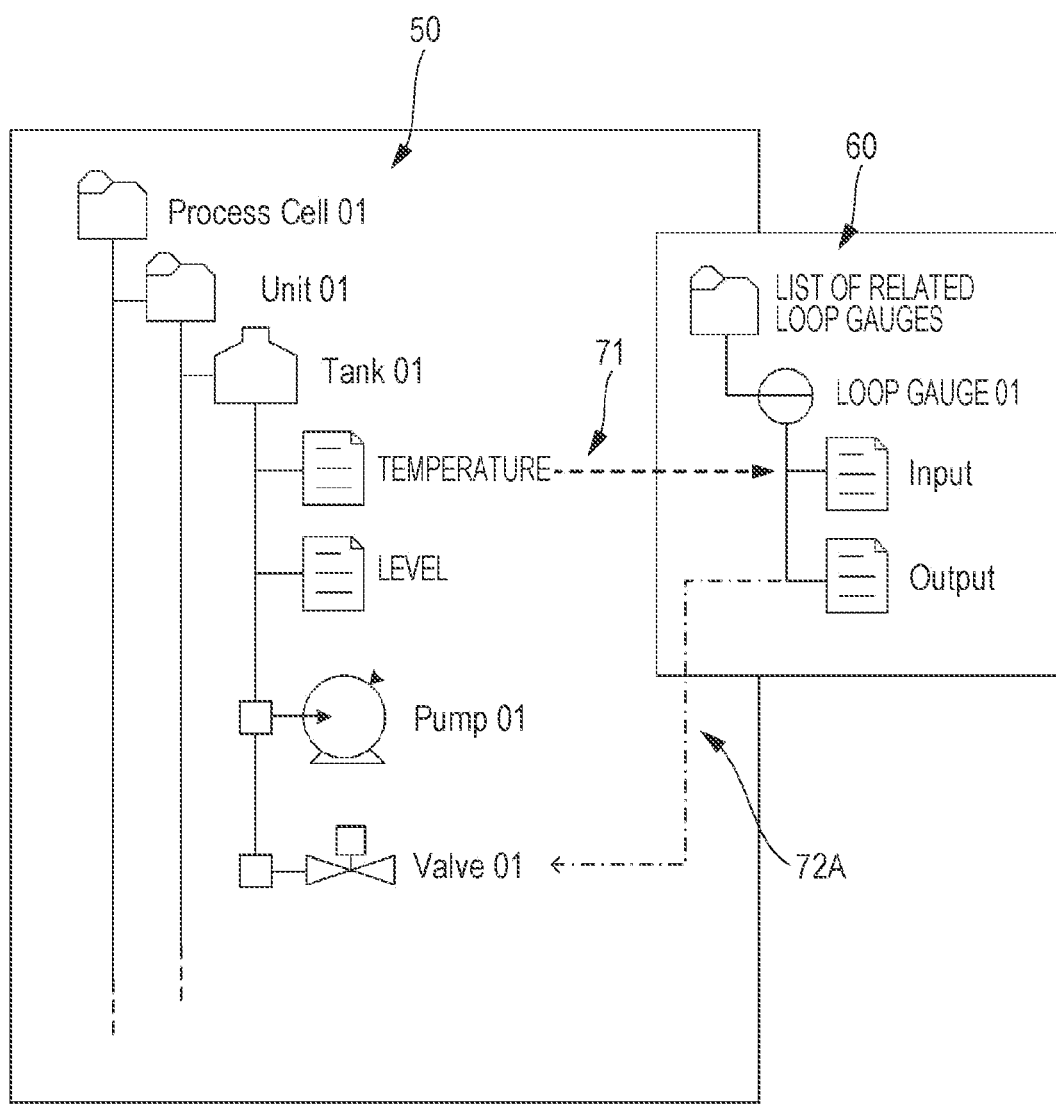
FIG. 5 illustrates an example of drawing of a line that indicates a relation between nodes when a corresponding node is not displayed in the tree view.

FIG. 5 illustrates, for example, the case where a corresponding node is not displayed in the tree view when the line indicating the relation between nodes is drawn.

When the user requests the drawing of the tree view for the loop by designating, e.g., "Tank 01" in the tree view 50, the nodes bound to "Tank 01", i.e., "Pump 01" and "Valve 01", are in a closed state (i.e., a state not displaying their child nodes) in some cases.

In such a case, a line indicating the relation cannot be drawn for the node of an item bound to the closed node. Therefore, the line is drawn as follows.

As illustrated in FIG. 5, a line 72A indicating the relation is drawn from the "Output" of "Loop Gauge 01" toward "Valve 01". At that time, the line 72A is displayed in a different form from that of the line 72 (FIG. 2), thereby indicating that the corresponding node is not displayed. For example, the line 72A is displayed in different ways in type of drawn line and arrow shape from those of the line 72.

Thus, when the node of the item as a target to which the line is to be connected is not displayed, the line is drawn to be connected to the parent node of the relevant node, thus enabling the user to confirm the related node being a node of an item bound to which node.

Furthermore, with the change in the display form of the line, the user can confirm that the node of the item as a target to which the line is to be connected is not displayed because the upper-level node is folded, and that the line is connected to the parent node instead.

While the above-described embodiment represents, for example, the case indicating the relation between the equipment/device and the loop gauge, other examples of the in-plant information may form the loop structure in addition to the combination of the equipment/device and the loop gauge.

Figure 6:
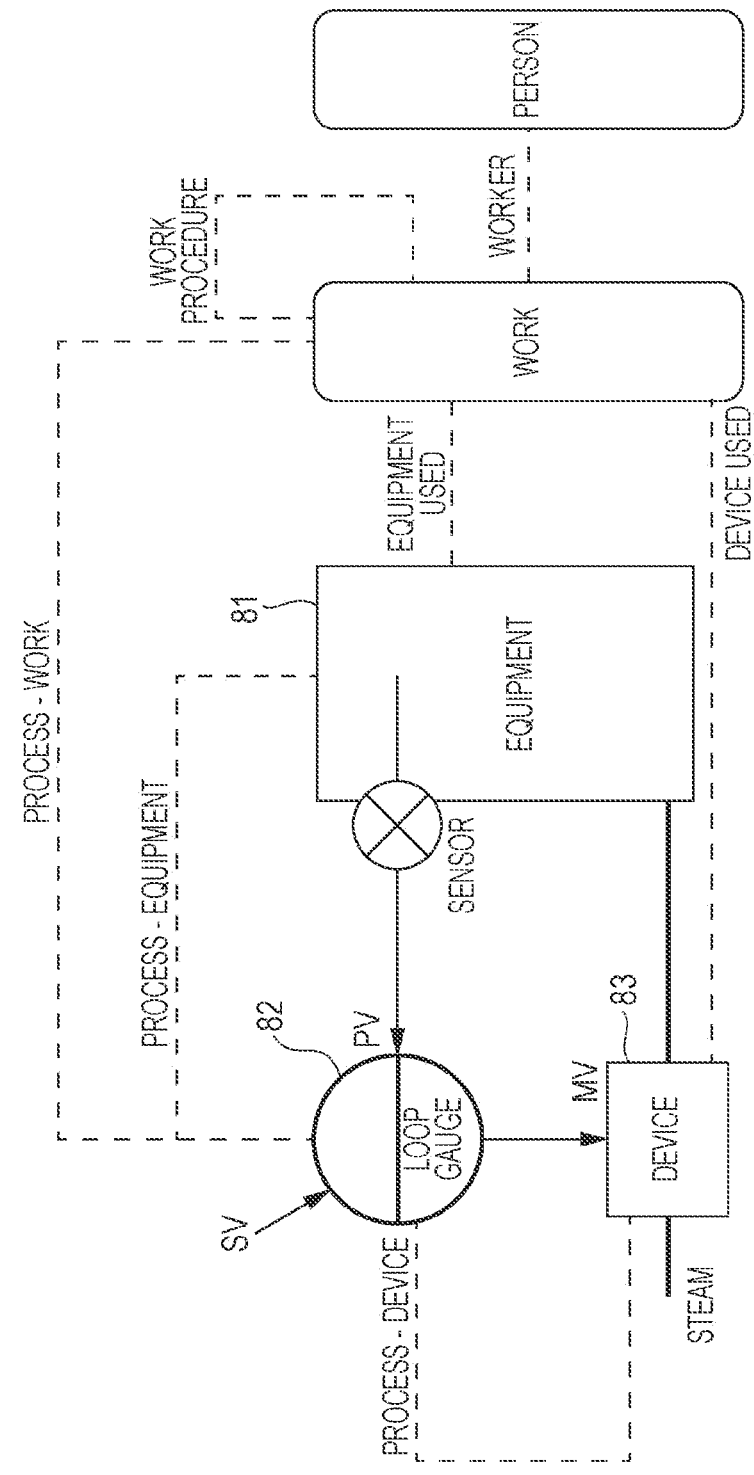
FIG. 6 illustrates examples of loop structures formed in a plant.
Figure 7:
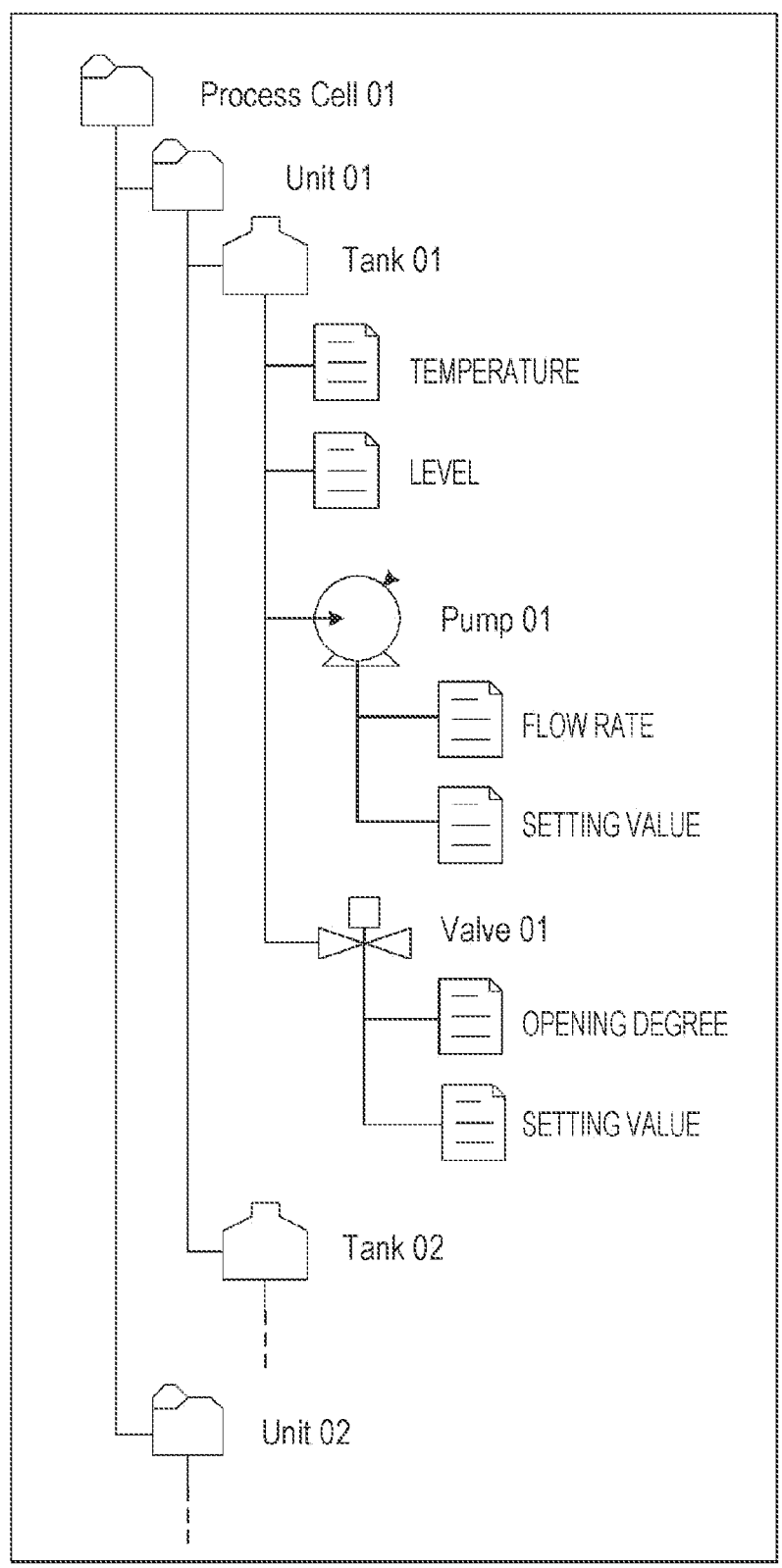
FIG. 7 illustrates a display example of a tree view with the related art.

FIG. 6 illustrates examples of loop structures formed in a plant.

In FIG. 6, a control loop formed by equipment 81, e.g., a tank, a loop gauge 82, and a device 83, e.g., a valve, is as per described above in the embodiment. In addition, the following relations are conceivable, for example, as providing loop structures in different forms.

(1) Relation in which positions of the equipment/device and the loop gauge are reversed to those in the above-described embodiment. In this case, a tree view is first displayed with the loop gauge being regarded as a main target. Another tree view of equipment/devices is then displayed upon designation of an element on the tree view first displayed. Moreover, lines indicating the relation between the designated element and a corresponding element are drawn across the two tree views.

(2) Relation between equipment/device and work (device used).

(3) Relation between work and equipment (equipment used).

(4) Relation between equipment/device and person.

(5) Relation between person and equipment/device.

(6) Relation between work and loop gauge.

(7) Relation between loop gauge and work.

(8) Relation between work and person.

(9) Relation between person and work.

The present invention can be applied to those relations as well.

With the plant information display method and display apparatus according to the present invention, as described above, since a relation between elements separately contained in plural tree view representations based on different viewpoints are graphically displayed, plant information can be represented in a way capable of representing information that cannot be represented using only the tree structure.

An application range of the present invention is not limited to the above-described embodiment. The present invention can widely be applied to plant information display methods, etc., which are used to display elements related to a plant in a tree view of hierarchical representations.

What is claimed is:

1. A plant information display method for displaying elements related to a plant in a tree view of hierarchical representation, the method comprising:

displaying plural tree view representations based on different viewpoints side by side; and graphically displaying a relation between elements separately contained in the plural tree view representations, which are displayed in the displaying of plural tree view representations, wherein the graphically displaying the relation between the elements includes displaying a line connecting a measured value element in a first tree view display that provides a control input and an input element in a second tree view display that receives the control input, the graphically displaying the relation between the elements further includes displaying a line connecting an output element in the second tree view display that provides a control output and a setting value element in the first tree view display that receives the control output, the measured value element is a node of an item representing measured value, the setting value element is a node of an item representing setting value, the second tree view display has a node of a loop gauge forming a control loop, the input element is a node of an item representing a control input to the loop gauge, and the output element is a node of an item representing a control output from the loop gauge.

2. The plant information display method according to claim 1, further comprising:

previously storing relation information indicating the relation between the elements separately contained in the plural tree view representations based on different viewpoints, wherein the graphically displaying the relation between elements includes displaying the relation between the elements based on the relation information stored in the storing step.

3. The plant information display method according to claim 2, wherein the graphically displaying the relation between elements includes displaying the relation between the elements for, instead of an element not appearing in the tree view representations, a parent element of the former element, the parent element appearing in the tree view representations.

4. The plant information display method according to claim 1, wherein the graphically displaying the relation between elements includes displaying the relation between the elements for, instead of an element not appearing in the tree view representations, a parent element of the former element, the parent element appearing in the tree view representations.

5. A plant information display apparatus for displaying elements related to a plant in a tree view of hierarchical representation, the apparatus comprising:
    a memory that stores information used to display the plant information;
    a monitoring apparatus on which the elements related to the plant in the tree view hierarchical representation are displayed; and
    an information processing device that performs a process to display the elements related to the plant in the tree view hierarchical representation, comprising:
        displaying plural tree view representations based on different viewpoints side by side; and
        graphically displaying a relation between elements separately contained in the plural tree view representations, which are displayed in the displaying plural tree view representations,
        wherein the graphically displaying the relation between the elements includes displaying a line connecting a measured value element in a first tree view display that provides a control input and an input element in a second tree view display that receives the control input,
        the graphically displaying the relation between the elements further includes displaying a line connecting an output element in the second tree view display that provides a control output and a setting value element in the first tree view display that receives the control output,
        the measured value element is a node of an item representing measured value,
        the setting value element is a node of an item representing setting value,
        the second tree view display has a node of a loop gauge forming a control loop,
        the input element is a node of an item representing a control input to the loop gauge, and
        the output element is a node of an item representing a control output from the loop gauge.

6. A non-transitory computer-readable medium having an executable program for displaying elements related to a plant in a tree view of hierarchical representation stored thereon, wherein the program instructs a computer to perform the following steps:
    a tree view display step of displaying plural tree view representations based on different viewpoints side by side; and
    a relation display step of graphically displaying a relation between elements separately contained in the plural tree view representations, which are displayed in the tree view display step,
    wherein the relation display step includes displaying a line connecting a measured value element in a first tree view display that provides a control input and an input element in a second tree view display that receives the control input,
    the relation display step further includes displaying a line connecting an output element in the second tree view display that provides a control output and a setting value element in the first tree view display that receives the control output,
    the measured value element is a node of an item representing measured value,
    the setting value element is a node of an item representing setting value,
    the second tree view display has a node of a loop gauge forming a control loop,
    the input element is a node of an item representing a control input to the loop gauge, and
    the output element is a node of an item representing a control output from the loop gauge.

* * * * *